United States Patent [19]
Carron et al.

[11] 3,857,284
[45] Dec. 31, 1974

[54] DEVICE AND METHOD FOR MEASURING THE WATER-VAPOR CONTENT OF A LIQUID OR GASEOUS MEDIUM

[75] Inventors: Georges Carron; Gaetan Pleyber; Jean-Louis Violet, all of Grenoble, France

[73] Assignee: Commissariat A L'Energie Atomique, Paris, France

[22] Filed: June 21, 1972

[21] Appl. No.: 264,707

[30] Foreign Application Priority Data
June 21, 1971 France .............................. 71.22451

[52] U.S. Cl. ................ 73/336.5, 136/242, 324/61 P
[51] Int. Cl. ......................................... G01n 25/66
[58] Field of Search .......... 73/336.5, 335, 73, 17 A, 73/341; 136/234, 242; 324/61 P

[56] References Cited
UNITED STATES PATENTS
| | | | |
|---|---|---|---|
| 2,843,646 | 7/1958 | Conant | 136/242 |
| 2,904,995 | 9/1959 | Obermaier | 73/17 A |
| 3,075,385 | 1/1963 | Stover | 73/335 |
| 3,297,818 | 1/1967 | McCleery | 136/242 X |
| 3,523,244 | 8/1970 | Goodman et al. | 73/336.5 X |
| 3,664,192 | 5/1972 | Campbell et al. | 73/336.5 |

*Primary Examiner*—Donald O. Woodiel
*Assistant Examiner*—Daniel M. Yasich
*Attorney, Agent, or Firm*—Craig & Antonelli

[57] ABSTRACT

The device consists of a hygrometer probe of the type which is based on the principle of adsorption of water vapor on a film-layer and comprises assembly including a thermocouple arranged in a metallic sleeve, a coating around the assembly and formed successively by a layer of aluminum, a layer of alumina and a porous metallic layer, these layers being bonded to each other and the first layer being bonded to the thermocouple assembly, and connections joined respectively to the thermocouple assembly and to the coating.

13 Claims, 4 Drawing Figures

FIG. 1
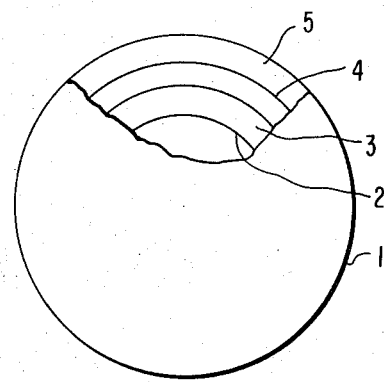
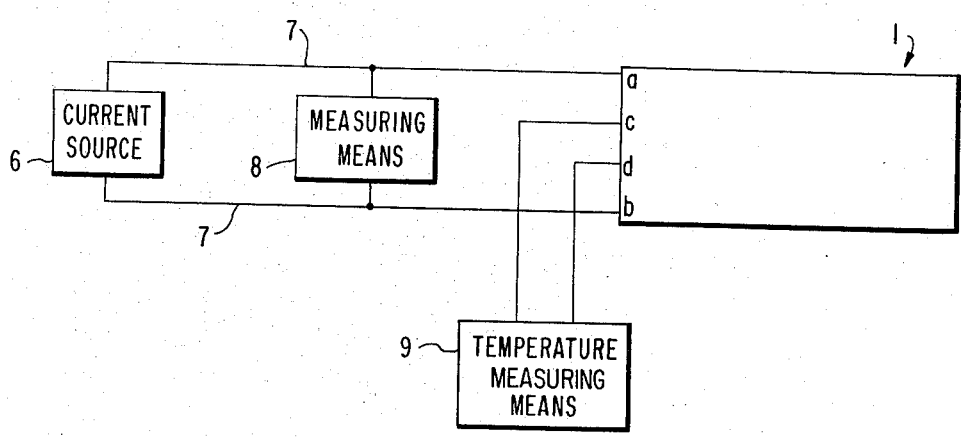
FIG. 2

DEVICE AND METHOD FOR MEASURING THE WATER-VAPOR CONTENT OF A LIQUID OR GASEOUS MEDIUM

This invention relates to measurements of water-vapor content by adsorption of said water vapor on a porous film-layer.

The primary aim of the invention is to provide a device for measuring the water-vapor content of a liquid or gaseous medium, said device being essentially constituted by a hygrometer probe of the type which is based on the principle of adsorption of water vapor on a film-layer and which comprises an assembly including a thermocouple arranged in metallic sleeve, a coating around said assembly and formed successively by a layer of aluminum, a layer of alumina which is porous and a porous metallic layer, said layers being bonded to each other and the first layer being bonded to the theremocouple assembly, and connections joined respectively to the thermocouple body and to the coating.

The probe of said device differs from those which are already employed for the same applications and especially from the probe which is disclosed in French patent application No. 71/22299 as filed on June 18, 1971 in the name of Commissariat a l'Energie Atomique and entitled "A method of fabrication of a probe for a hygrometer based on the principle of adsorption of water vapor on a film-layer of porous alumina and a hygrometer probe fabricated in accordance with said method," especially by virtue of the fact that the probe itself may be considered to form a thermocouple. This makes it possible to derive the measured values of hygrometry not only from measurements of impedance of the probe which is immersed in the medium considered but also from the temperature of the probe. A certificate of Addition No. 72/20175 to the main patent application cited above consists in replacing the polycrystalline aluminum support which is employed in said patent application by a support formed of aluminum or of monocrystalline aluminum alloy and U.S. Pat. No. 3,821,093 corresponds to the French patent application and certificate of addition.

In accordance with the special arrangements of the invention, the thermocouple assembly advantageously has a diameter within the range of 1 to 2 mm approximately and the thickness of the aluminum layer which is formed around the thermocouple assembly is advantageously of the order of a few tenths of a millimeter. The object of said aluminum layer is to permit the formation of the alumina layer which is porous and to support this latter layer. As in the French patent application and the Addition which have been cited earlier, it is in fact necessary to construct a probe from an aluminum core, said core being constituted in this case by a thermocouple assembly which is coated with a layer of aluminum.

In order to permit measurement of the water-vapor content, the device in accordance with the invention advantageously comprises a current source having predetermined characteristics, means for connecting the probe to said source and means for measuring the impedance and means for measuring the temperature of the probe.

By passing an electric current having predetermined characteristics through the probe, the use of a device of this type makes it possible to deduce the value of the moisture content to be determined from the measured values of the impedance and of the temperature of the probe.

This value of moisture content can be deduced by reference to one or a number of graphs which have previously been plotted by calibration of an identical probe in media having known characteristics.

In accordance with another process which leads to the same objective, an electric current at constant frequency is passed through the probe, thermal regulation or temperature control of the probe is carried out at least during the periods of measurement, a signal is caused to be delivered by the probe when this latter passes beyond the dew-point of the medium in which it is immersed and the thermal regulation of the probe is made responsive to said signal.

It is readily apparent that the device which is employed in the case just mentioned is provided with probe-regulating means.

A more complete understanding of the invention will be obtained from a perusal of the following description and the drawings wherein:

FIG. 1 is an end view of the probe in partial section to illustrate the layers forming the coating on the thermocouple assembly FIG. 2 is a schematic representational view of a circuit arrangement for the probe of the present invention;

Figure 3:
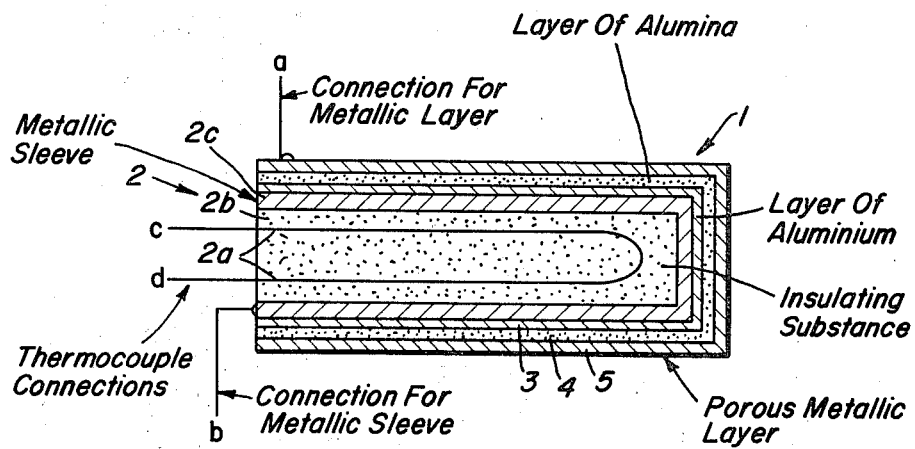
FIG. 3 is a longitudinal sectional view of the probe in accordance with the present invention.

The device in accordance with the invention comprises, in a first embodiment as shown in FIGS. 1, 2 and 3:

a hygrometer probe 1 comprising an assembly 2 formed by a thermocouple 2a disposed in an insulating substance 2b and surrounded by a metallic sleeve 2c having a diameter within the range of 1 to 2 mm approximately, with the thus formed thermocouple assembly having a coating formed by a layer of aluminum 3 which has a thickness of a few tenths of a millimeter and supports a layer of alumina 4 over which is placed a metallic layer 5, and connections a–d joined to the thermocoupler, the thermocouple assembly and to the coating, the connection a being provided at the metallic layer of the coating connection b at the metallic sleeve 2c of the thermocouple assembly and connections c and d for the thermocouple;

an alternating or direct current source 6 have predetermined characteristics;

means 7 for connecting the probe via connections a and b to said current source;

and means 8 for measuring the impedance via connections a and b and means 9 for measuring the temperature of the probe via the thermocouple connections c and d.

Apart from its central component, namely the thermocouple assembly, the probe of the device aforesaid can be constructed as described in the French application and Addition which have been mentioned earlier.

In particular, the aluminum layer 3 can be deposited either by magnetoforming of an aluminum tube or by Schooping-gun spray-coating, or by dipping in the molten aluminum of the thermocouple assembly which has previously been coated with a layer of titanium.

In these three cases, the treatment described in the above-cited French patent application and Addition is applied to the aluminum layer.

Similarly, the porous metallic layer 5 can in particular be either of NiCr or of Cr having good adherence on the alumina.

The means 8 for measuring the impedance and the means 9 for measuring the temperature of the probe can be standard means such as a multivibrator assembly in the case of impedance measurement.

The method of measurement which involves application of this first embodiment of the device according to the invention after the probe has been immersed in the medium whose water-vapor content is to be determined consists in measuring the temperature and the impedance of the probe (said impedance being subject to variation according to the characteristics of the medium in which the probe is immersed) and then in referring to one or a number of graphs which have previously been plotted by calibration of an identical probe in media having known characteristics.

Figure 4:
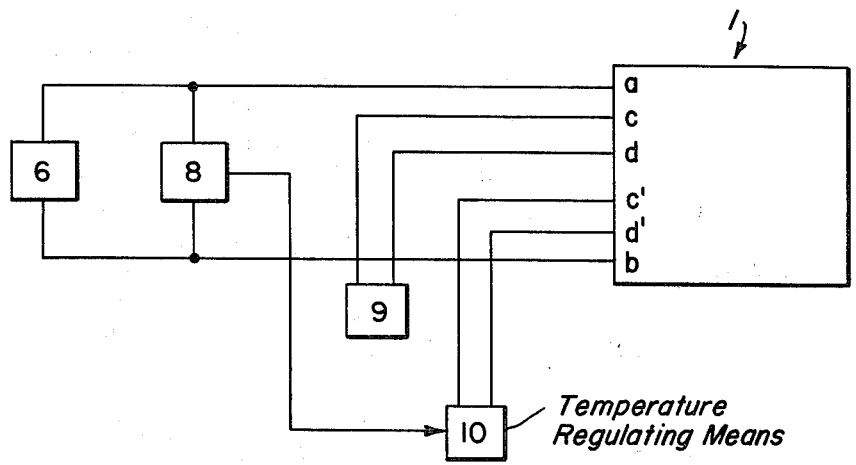
FIG. 4 is a schematic representational view of another circuit arrangement for a probe having temperature regulation.

In a second embodiment of the device according to the invention, as shown in FIG. 4, said device is provided, in addition to means which are identical with those of the first embodiment hereinabove described, with temperature-regulating or control means 10.

Temperature regulation is carried out by means of a cold-hot cycle obtained either by electrical heating means for evaporating a liquid (freon or liquid nitrogen, for example) or by means of a Peltier element which is included in the thermocouple assembly and provided with connections c' and d'.

The method of measurement which involves application of this second embodiment of the device according to the invention after the probe has been immersed in the medium whose water-vapor content is to be determined consists in causing a signal to be delivered by the probe when this latter has overstepped the dew-point of the medium as determined by the impedance measuring means 8 and in making the thermal regulation means 10 responsive to said signal for effecting the desired temperature control.

The device does not call for preliminary calibration and is so designed as to secure freedom from aging of the alumina layer.

As can readily be understood, the invention is not limited to the embodiments which have been given by way of example but extends to any or all alternative forms.

What we claim is:

1. A device for measuring the water-vapor content of a liquid or gaseous medium, wherein said device includes at least a hygrometer probe of the type which is based on the principle of adsorption of water-vapor on a film-layer of porous alumina, said probe comprising a thermocouple assembly including a thermocouple arranged within a metallic sleeve member and insulated therefrom, a coating around said thermocouple assembly and comprising successively formed layers including a layer of aluminum covering said metallic sleeve, a layer of alumina covering said aluminum layer and an outer porous metallic layer covering said alumina layer, said layers being bonded to each other and said aluminum layer being bonded to said metallic sleeve, and connections for measuring means being provided at least at predetermined points at each of said thermocouple, metallic sleeve and metallic layer.

2. A device according to claim 1, wherein the thickness of the aluminum layer is of the order of a few tenths of a millimeter.

3. A device according to claim 1, wherein said device comprises a current source and means for connecting the probe to said source via the connections at said probe.

4. A device according to claim 3, wherein said device comprises means for measuring the impedance and means for measuring the temperature of the probe.

5. A device according to claim 4, wherein said device comprises means for thermal regulation of the probe.

6. A device according to claim 1, wherein the thermocouple assembly has a diameter within the range of 1 to 2 mm approximately.

7. A device according to claim 6, wherein the thickness of the aluminum layer is of the order of a few tenths of a millimeter.

8. A device according to claim 7, wherein said device comprises a current source and means for connecting the probe to said source via the connection at the metallic sleeve and metallic layer.

9. A device according to claim 8, wherein said device further comprises measuring means for measuring the impedance of said probe connected to the metallic sleeve and metallic layer and measuring means for measuring the temperature of said probe connected to said thermocouple.

10. A device according to claim 9, wherein said device further comprises means for controlling the temperature of said probe.

11. A method for measuring the water-vapor content of a liquid or gaseous medium comprising the steps of utilizing a hygrometer probe of the type which is based on the principle of adsorption of water-vapor on a film-layer of porous alumina, the probe comprising a thermocouple assembly including a thermocouple arranged within a metallic sleeve member and insulated therefrom, a coating around the thermocouple assembly comprising successively formed layers including a layer of aluminum on the metallic sleeve, a layer of alumina on the aluminum layer and an outer porous metallic layer, the layers being bonded to each other and the aluminum layer being bonded to the metallic sleeve, immersing the probe in the medium to be measured, the medium having a dew-point, passing an electric current having predetermined characteristics through the probe, measuring values of the impedance and temperature of the probe and determining the value of the moisture content of the medium from the measured values of the impedance and temperature of the probe.

12. A method according to claim 11, wherein the value of moisture content to be determined is deduced by reference to at least one graph which has previously been plotted by calibration of an identical probe in media having known characteristics.

13. A method according to claim 11, wherein an electric current at constant frequency is passed through the probe and further comprising the steps of regulating the temperature of the probe at least during periods of measurement, providing a signal by the probe when the probe passes beyond the dew-point of the medium in which it is immersed and regulating the temperature of the probe in response to the signal.

* * * * *